United States Patent [19]
Franaszek

[11] Patent Number: 5,761,536
[45] Date of Patent: Jun. 2, 1998

[54] SYSTEM AND METHOD FOR REDUCING MEMORY FRAGMENTATION BY ASSIGNING REMAINDERS TO SHARE MEMORY BLOCKS ON A BEST FIT BASIS

[75] Inventor: Peter Anthony Franaszek, Mount Krisco, N.Y.

[73] Assignee: International Business Machines Corporation, Armonk, N.Y.

[21] Appl. No.: 701,143

[22] Filed: Aug. 21, 1996

[51] Int. Cl.$^6$ .................................. G06F 7/00
[52] U.S. Cl. .................... 395/888; 395/651; 341/55
[58] Field of Search ................... 395/888, 651, 395/828, 497.01, 497.02, 497.04; 341/51, 55, 50

[56] References Cited

U.S. PATENT DOCUMENTS

| | | | |
|---|---|---|---|
| 3,717,851 | 2/1973 | Cocke et al. | 711/220 |
| 4,467,421 | 8/1984 | White | 711/118 |
| 5,479,633 | 12/1995 | Wells et al. | 711/103 |
| 5,572,206 | 11/1996 | Miller et al. | 341/51 |

OTHER PUBLICATIONS

Knuth, D., "Fundamental Algorithms"; Addison–Wesley Publishing Company, pp. 442–444 (1980).

*Primary Examiner*—Kevin A. Kreiss
*Attorney, Agent, or Firm*—Heslin & Rothenberg, P.C.

[57] ABSTRACT

A system and method for storing variable length objects such that memory fragmentation is reduced, while avoiding the need for memory reorganization. A remainder of a variable length object may be assigned to share a fixed-size block of storage with a remainder from another variable length object (two such remainders which share a block are referred to as roommates) on a best fit or first fit basis. One remainder is stored at one end of the block, while the other remainder is stored at the other end of the block. The variable length objects which are to share a block of storage are selected from the same cohort. Thus, there is some association between the objects. This association may be that the objects are from the same page or are in some linear order spanning multiple pages, as examples. Information regarding the variable length objects of a cohort, such as whether an object has a roommate, is stored in memory.

44 Claims, 4 Drawing Sheets

SYSTEM AND METHOD FOR REDUCING MEMORY FRAGMENTATION BY ASSIGNING REMAINDERS TO SHARE MEMORY BLOCKS ON A BEST FIT BASIS

TECHNICAL FIELD

This invention relates, in general, to computer architecture, and, in particular, to the organization and function of random access memories.

BACKGROUND ART

An emerging development in computer organization is the use of data compression in main or random access memory, such that each cache line may be compressed before storage in main memory. It is convenient to organize the memory space as a collection of fixed size blocks. Each cache line, after compression, is a variable-length object which then occupies some number of blocks. For example, cache lines of 1 k bytes (before compression) might be stored in blocks of 256 bytes after compression. Generally, the technique will include some escape mechanism so that the line will be stored as is, if the compression algorithm would otherwise cause it to grow in length.

A problem that arises in a system of this type is that generally, at least one of the blocks occupied by an object is only partially occupied. This is because the size of the object, or that part of the object for which storage need be allocated will, in general, not be an even multiple of the block size. Thus, part of the object, referred to herein as the remainder, is stored in only part of a block. The rest of the block is not used and is termed a fragment. The collection of such fragments is called the memory fragmentation. As an example, if lines are of length 1024 bytes, and space is allocated in blocks of 256 bytes, then a compression ratio of 0.5 would yield an average of two blocks per line. If the block holding the remainder is on average ½ occupied, the result is that approximately 20% of the space is lost to fragmentation.

A well-known approach to mitigating this problem is the so-called "buddy system," described in "Fundamental Algorithms" by D. Knuth, published by Addison-Wesley Publishing Company, 1980. Here blocks of storage are split into successively smaller subblocks. For example, a 256 byte block might be split into two 128 byte blocks and one of these further split into two 64 byte blocks. The result is a lowering of fragmentation while increasing the number of block sizes, and the number of blocks and subblocks used.

An undesirable feature of the "buddy system" approach is that the number of blocks and subblocks used for storing an object may be larger than with a conventional unitary block size approach (even though the amount of space occupied is smaller), thus increasing the number of block addresses that need to be kept. Another and more serious disadvantage is that over a period of time, with blocks allocated and deallocated, the number of split blocks tends to increase, with the result that a periodic reorganization or garbage collection of storage is required.

Based on the foregoing, a need exists for an enhanced mechanism for reducing memory fragmentation. Further, a need exists for a technique that reduces memory fragmentation without increasing the number of block sizes, and the number of blocks and subblocks used. Yet another need exists for a mechanism that reduces memory fragmentation while avoiding the need for memory reorganization.

SUMMARY OF THE INVENTION

The shortcomings of the prior art are overcome and additional advantages are provided through the provision of a method for storing variable length objects in storage. A remainder for a variable length object is determined. The remainder represents a portion of the variable length object that takes up less than a full fixed-size block of storage. The remainder is stored in a fixed-size block of storage, wherein the fixed-size block of storage is adapted to receive another remainder of another variable length object. The variable length object and the another variable length object are of the same cohort.

In another embodiment of the invention, the remainder is stored at one end of the fixed-size block of storage, while the another remainder is stored at another end of the block.

In a further embodiment of the invention, the another remainder to be stored as a roommate of the remainder is selected based upon a predefined function. In one example, this predefined function is a best fit function.

In a further embodiment of the invention, a method for storing variable length objects in storage is provided. A cohort of objects is defined. The cohort of objects is a subset of a plurality of variable length objects. A number, N, of full fixed-size blocks of storage required to store an object of the cohort is determined. Additionally, a remainder for the object is determined. The remainder represents a portion of the object that does not fit within the N full fixed-size blocks of storage. Another fixed-size block of storage is selected to store the remainder, which has stored therein another remainder of another object of the cohort. The object, except for the remainder, is then stored in the N full fixed-size blocks and the remainder is stored in the selected another fixed-size block.

In a further embodiment, the another fixed-size block of storage is selected, based upon a predefined function. In one embodiment, this predefined function is a best fit function.

In a further aspect of the invention, a system for storing variable length objects in storage is provided. The system includes means for determining a remainder for a variable length object. The remainder represents a portion of the variable length object that takes up less than a full fixed-size block of storage. The system also includes a fixed-size block of storage, which stores the remainder and is adapted to receive another remainder of another variable length object. The variable length object and the another variable length object are of a same cohort.

In another embodiment of the invention, a system for storing variable length objects in storage is provided. The system includes means for defining a cohort of objects, wherein the cohort is a subset of a plurality of variable length objects; a number, N, of full fixed-size blocks of storage to store an object of the cohort; means for determining a remainder for the object; another fixed-size block of storage to store the remainder, in which the another fixed-size block of storage has another remainder of another object of the cohort stored therein; and means for storing the object, except for the remainder, in the N full fixed-size blocks and means for storing the remainder in the selected another fixed-size block.

In yet a further aspect of the invention, a computer program product including a computer useable medium having computer readable program code means therein for use in storing variable length objects in storage is provided. The computer readable program code means in the computer program product includes computer readable program code means for causing a computer to affect determining a remainder for a variable length object. The remainder represents a portion of the variable length object that takes up less than a full fixed-size block of storage. Additionally, the computer readable program product includes computer readable program code means for causing a computer to affect storing the remainder in a fixed-size block of storage. The fixed-size block of storage is adapted to receive another remainder of another variable length object. The variable length object and the another variable length object being of a same cohort.

In another embodiment of the invention, a computer program product including a computer useable medium having computer readable program code means therein for use in storing variable length objects in storage is provided. The computer readable program code means in the computer program product includes computer readable program code means for causing a computer to affect defining a cohort of objects, which is a subset of a plurality of variable length objects. Additionally, it includes computer readable program code means for causing a computer to affect determining a number, N, of full fixed-size blocks of storage required to store an object of the cohort of objects; computer readable program code means for causing a computer to affect determining a remainder for the object; and computer readable program code means for causing a computer to affect selecting another fixed-size block of storage to store the remainder. The another fixed-size block of storage having stored therein another remainder of another object of the cohort of objects. Further, the computer program product includes computer readable program code means for causing a computer to affect storing the object, except for the remainder, in the N full fixed-size blocks and to affect storing the remainder in the selected another fixed-size block.

It is an object of this invention to provide an effective means for reducing fragmentation, while avoiding the need for memory reorganization. It is a further object of this invention to limit the number of blocks within which a line is stored. These and further objects and features are provided via a mechanism for sharing of blocks between lines, where there is no splitting of blocks into subblocks. Instead, a remainder may be assigned to share a block with a remainder from another line (two such remainders which share a block are referred to herein as roommates) on a best.fit or first fit basis.

In one embodiment, the remainder is assigned to share a block (on a best fit or first fit basis) with another remainder from its cohort which currently is not sharing a block. The remainder is then written to the extreme other end of the block it shares with its roommate. If no such roommate can be found (for example when a line is the first to be written of those in a cohort), the remainder is allocated a block, which it later might share with a roommate. When a changed version of a line is to be written out, the blocks it previously held are returned to a list of free blocks. If its remainder had no roommate, its block is also returned to the free list. Otherwise, if the remainder shares a block with a roommate, the remainder is erased from that block (e.g., the locations it occupied in the block are replaced by nulls) and the block is not deallocated. Alternatively, rather than erasing the remainder from that block, pointers to the remainder located in a directory are eliminated.

The present invention advantageously limits the number of addresses that need to be stored, since the number of blocks occupied by a line is not affected by the presence of a roommate, and it eliminates the need for memory reorganization or garbage collection.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

Figure 1:
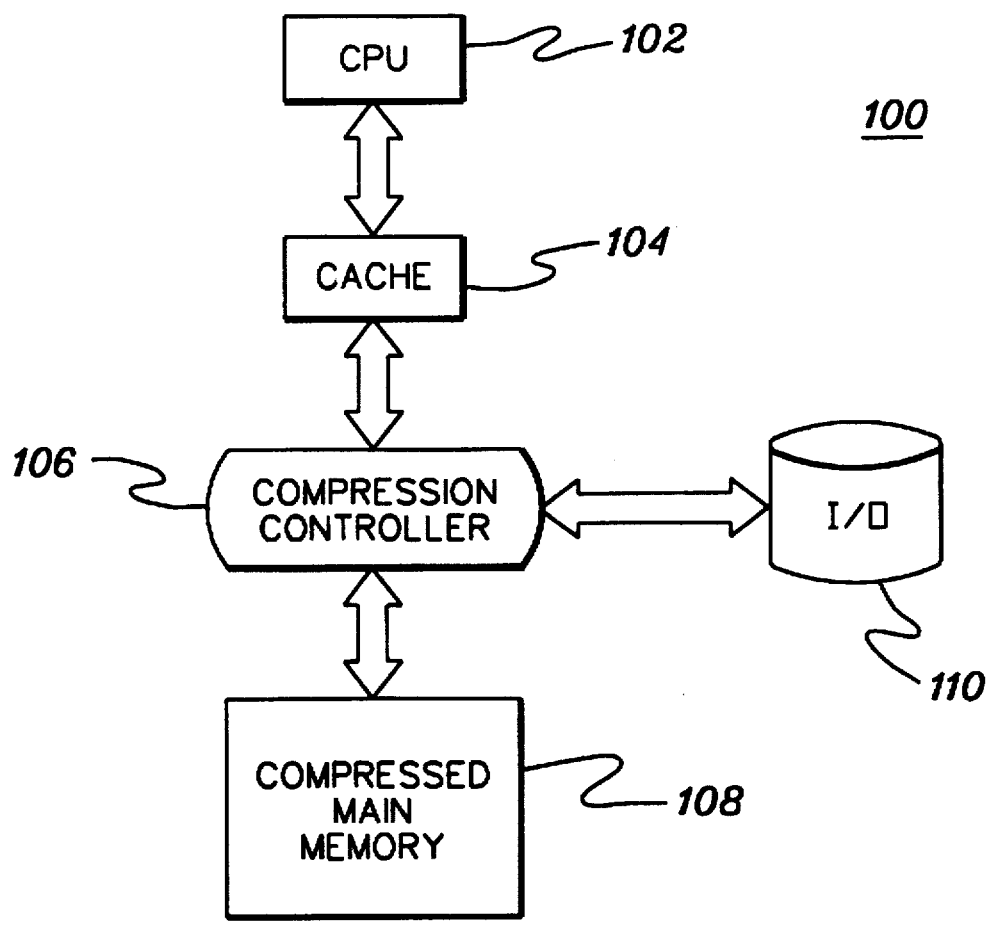
FIG. 1 depicts one example of a computing system incorporating the memory organization mechanism of the present invention.

FIG. 1 depicts one example of a block diagram of a computing system 100 incorporating the memory organization mechanism of the present invention. In one embodiment, computing system 100 includes a large server system, which except for the compression controller (described below) is exemplified by an RS/6000 offered by International Business Machines Corporation. Computing system 100 includes, for example, a central processing unit 102, a cache 104, a compression controller 106, compressed main memory 108 and one or more I/O devices 110, each of which is described in detail below.

As is known, central processing unit 102 is the controlling center of computing system 100. It executes at least one operating system (not shown), which controls the execution of programs and the processing of data, as is well known. Coupled to central processing unit 102 is cache memory 104. Cache memory 104 provides a short term, high-speed, high-capacity computer memory for data retrieved by compression controller 106 from I/O devices 110 and/or main memory 108.

Coupled to cache 104 is compression controller 106, which manages, for example, the transfer of information between I/O devices 110 and cache 104, and/or the transfer of information between compressed main memory 108 and cache 104. Compression controller 106 incorporates and uses the memory organization technique of the present invention, as described in further detail below. (In another embodiment, the compression controller is not needed, and instead, the memory organization technique of the present invention is performed by other hardware and/or software components within computing system 100. As one example, the memory organization technique can be performed by programs executed by the CPU.)

As described above, compression controller 106 is coupled to one or more I/O devices 110 and compressed main memory 108. A page of memory having one or more cache lines is retrieved from the I/O devices by the compression controller and is compressed and stored in main memory 108, in accordance with the principles of the present invention. At the same time, it is possible that the page of memory retrieved from the I/O devices is also stored in cache 104 in an uncompressed state. However, if the page of memory is not stored in the cache (but is in main memory) and there is a request for a line of that page from the cache, a fault occurs. This results in a request being forwarded to the compression controller for the faulted line. The controller then fetches the line from main memory, decompresses the line and forwards it to the cache.

In one embodiment, each page of memory stored within compressed main memory 108 includes one or more compressed cache lines. As one example, a page includes four compressed cache lines, and each cache line is stored in a number of fixed-size blocks. As one example, each block is the same size (i.e., unitary sizing) and is, for instance, 256 bytes.

In one embodiment of the present invention, the lines of a page are referred to as a cohort. Thus, in the above example, one cohort contains the four cache lines. In another embodiment, however, only a subset of the lines of a page are considered a cohort. For example, two lines of a page could be considered a cohort. In yet another embodiment of the invention, a cohort includes lines from multiple pages. For example, a predefined number of lines, which can be from one or multiple pages, comprises a cohort. It is possible that the cohort can include a number of lines associated with a linear order, such that, for instance, the nth line might have as its cohort the previous two lines (n-2 and n-1), regardless of which page(s) they are on. These are all examples of a cohort. Other examples and embodiments of a cohort are also possible without departing from the spirit of the present invention. The one characteristic that all of the examples of a cohort has is that each cohort is some subset of a plurality of cached lines (or other variable length objects, as described below).

Figure 2A:
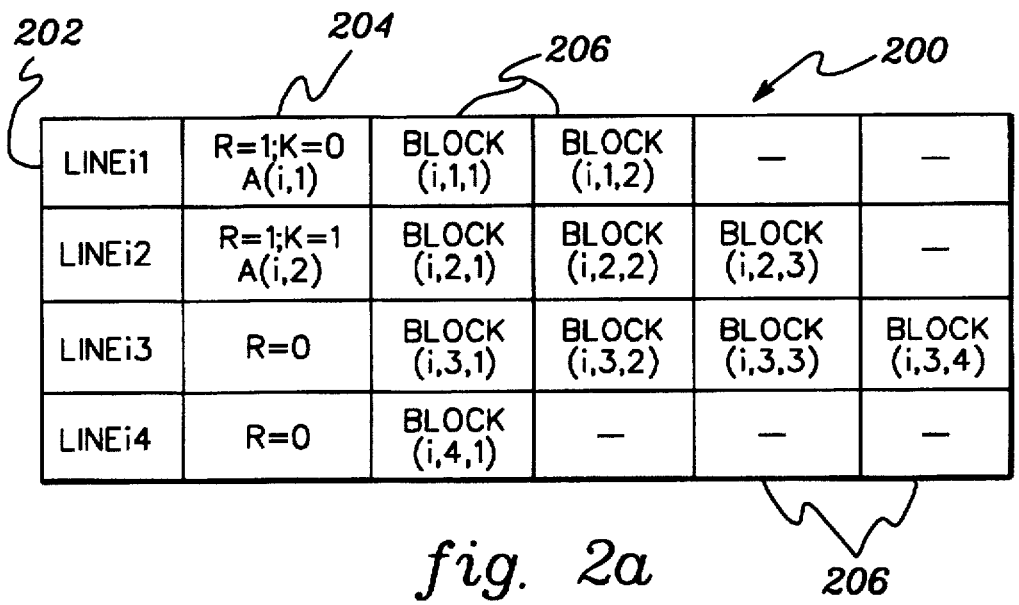
FIG. 2a depicts one example of a directory, including information for a page of compressed memory organized in accordance with the principles of the present invention.
Figure 2B:
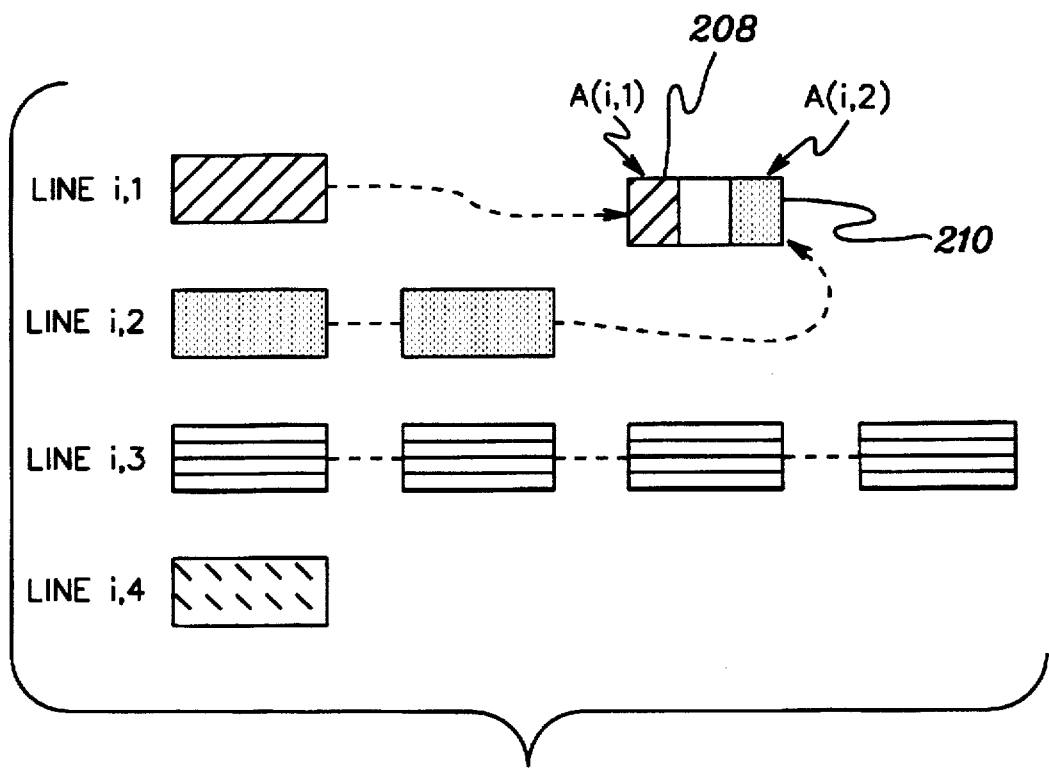
FIG. 2b depicts one embodiment of the allocation of storage blocks for a page of compressed memory organized in accordance with the principles of the present invention.

As described above, in one example, the four cache lines of a page make up a cohort. One example of the storage blocks used to store each of the four cache lines of the cohort in compressed main memory is depicted in FIGS. 2a–2b. FIG. 2a depicts a directory 200 stored within the compressed main memory that includes information about each of the lines, in accordance with the principles of the present invention, and FIG. 2b is a further depiction of the blocks used to store each of the lines.

Referring to FIG. 2a, in one example, directory 200 includes an identity of the lines for page i (202). Thus, if i=1, there would be four lines for page 1 indicated in the directory. Further, for each line of a page, the directory includes information for that line. For example, this information includes an indication of whether the last block of memory for a particular line is shared by a roommate, as described further below. If the line has a roommate, then R is set to 1; otherwise, it is set to 0 (see column 204 of directory 200). In the one example depicted in FIG. 2a, it is shown that lines 1 and 2 each have a roommate.

In addition to identifying a roommate, directory 200 indicates whether a remainder is stored in the last block of memory for a line. If there is a remainder, then K is set to either a 0 or 1, depending on the location of the remainder in the block. If the remainder is in the beginning of the block, then K is set equal to 0. On the other hand, if the remainder is at the end of the block, then K is set equal to 1 (see column 204). Again, in the above example, lines 1 and 2 each have a remainder. The remainder for line 1 is stored at the beginning of the last block for line 1 and the remainder for line 2 is stored at the end of the last block for line 2. As described in further detail below, the last block for lines 1 and 2 is the same block.

The directory also indicates the size of each remainder, which is identified by A(i,j), where i specifies the page and j specifies the line within the page (see column 204).

Additionally, the directory provides the identities of the blocks in compressed main memory 108 used to store each of the lines (206). These identities were provided via, for instance, the block available list, described below. For example, it is shown in directory 200 that line 1 of page i is stored within two blocks of storage, Block (i,1,1) and Block (i,1,2), respectively. Each entry in the directory designated by Block (i,j,m), where i is the page, j is the line and m is the block, actually includes a number of bits representing the block number in main storage. For instance, Block (i,1,2) includes a number of bits representing, for example, the 500th block in storage. Similarly, line 2 is stored within three blocks of storage, line 3 within four blocks and line 4 within one block of storage. This can also be seen in FIG. 2b.

As described above, each of lines 1 and 2 designates that it has a roommate. Since these are the only two lines in the cohort that have such a designation, they must be roommates with each other. Therefore, the last block which stores the remainder for line 1 also stores the remainder for line 2. That is, the block designated by (i,1,2) for line 1 is at the same memory location as the block designated by (i,2,3) for line 2 (i.e., in the above example, they are both at Block 500). Further, since K=0 for line 1, the remainder for line 1 is stored at the beginning of that block. Similarly, since K=1 for line 2, the remainder for line 2 is stored at the end of the same block. This can be seen in FIG. 2b at reference numerals 208, 210, respectively.

The directory described above is used, in accordance with the present invention, to fetch cache lines from the compressed main memory when, for instance, the request for the line, generated by the CPU, results in a cache fault indicating that the line is not in the cache. Further, the directory is used during the removal of cache lines from main memory, as well as the storage of cache lines in main memory, as described in detail below.

Figure 3:
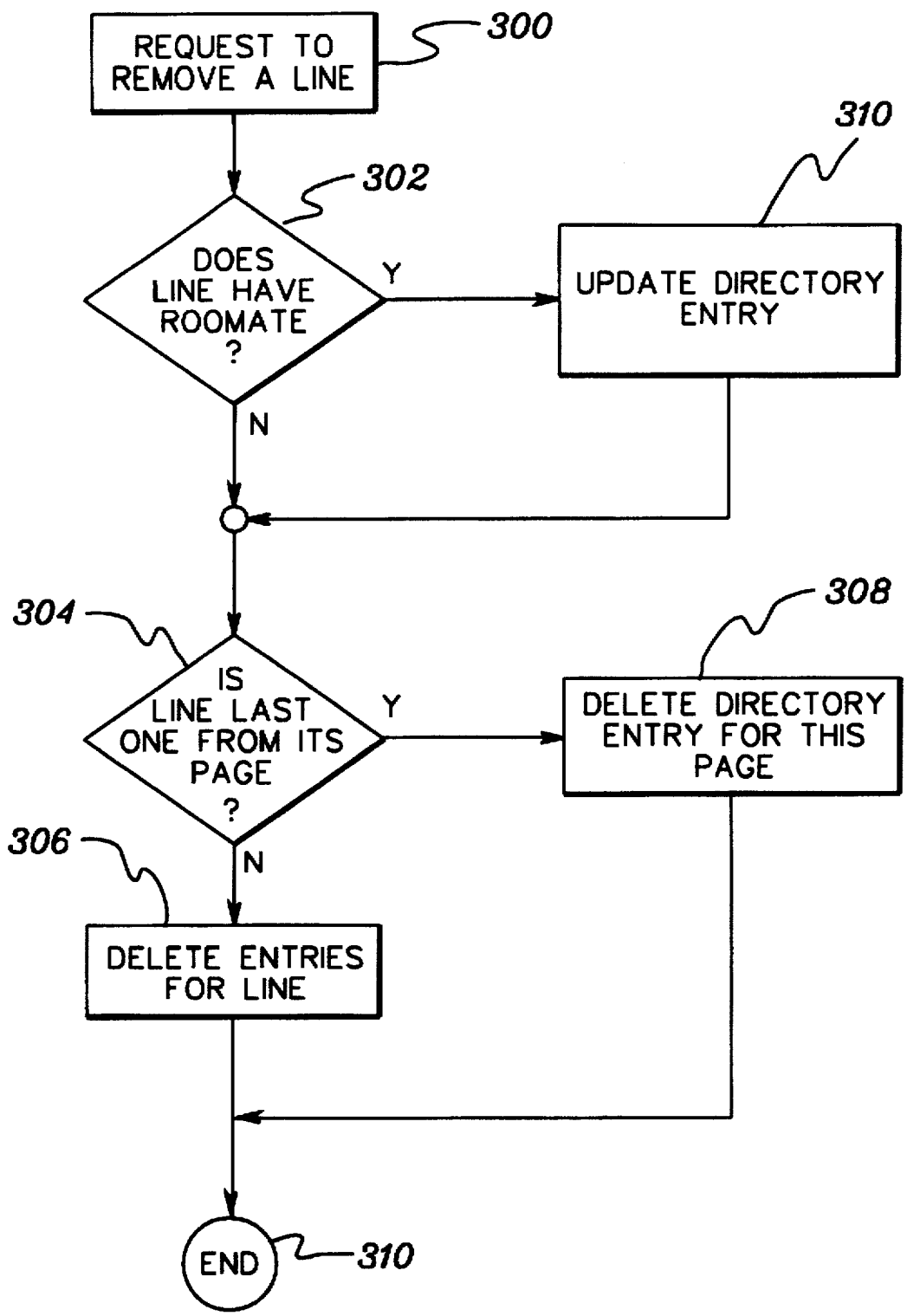
FIG. 3 depicts one example of the logic associated with deallocating storage, in accordance with the principles of the present invention.

One embodiment of the logic associated with the operation of removing a cache line from compressed main storage 108 is described in detail below with reference to FIG. 3. Initially, compression controller 106 issues a request to remove a particular cache line from the compressed main memory, STEP 300. Thereafter, a determination is made as to whether the line has a roommate by reading the directory entry for that line, INQUIRY 302. If R is equal to one indicating that the line has a roommate, then the roommate is located by searching the directory for the other line having the same end block as the line being removed (e.g., Block 500). When the roommate line is located, the directory entry for that line is updated by, for instance, changing the R=1 to R=0, STEP 310.

Thereafter, or if the line does not have a roommate, a further determination is made as to whether the line to be removed is the last line from the page, INQUIRY 304. This determination is made by looking at the entries in the directory for this page. If all of the directory entries for the page are zeroed out except for the current line being removed, then the line to be removed is the last one for the page. In that circumstance, any indication of the page is deleted from the directory, such that the directory no longer has any knowledge of the page, STEP 308. Additionally, the allocated blocks for the last line removed are returned to a block available list located in the compressed main memory.

If the line to be removed is not the last line from the page, INQUIRY 304, then the entries for that line in the directory are erased (for example, by placing zeros in all of the entries for the line) and the currently allocated blocks for that line are returned to the block available list, STEP 306.

Figure 4:
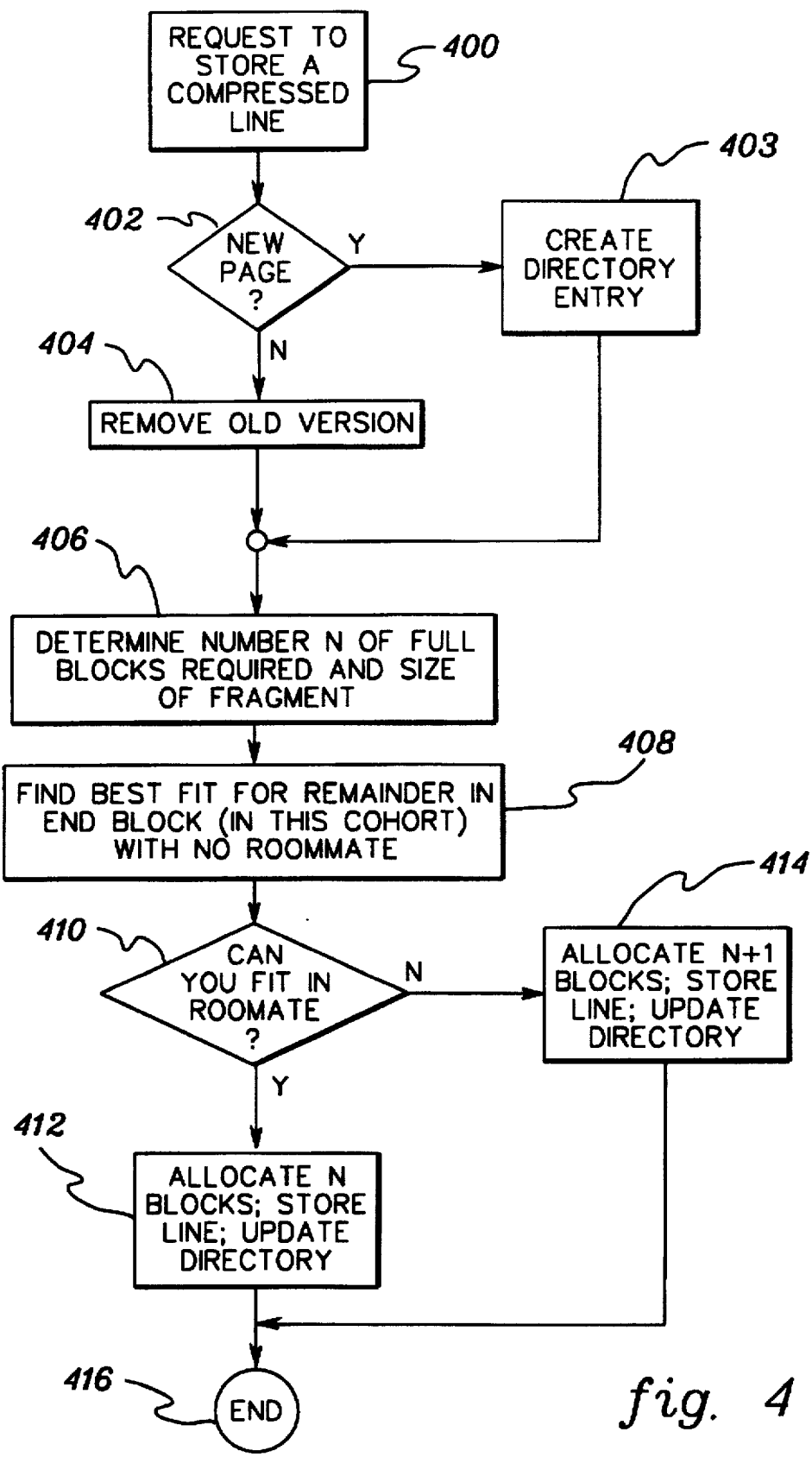
FIG. 4 depicts one example of the logic associated with allocating storage, in accordance with the principles of the present invention.

The block available list is used in the allocation of storage for a cache line. One embodiment of storing a compressed cache line in main memory 108 is described in detail with reference to FIG. 4. Initially, compression controller 106 makes a request to store a line in main memory that it has compressed, STEP 400. This process is initiated either because (a) this is a new page or (b) this is a changed line cast out from the cache. If this is a new page as indicated by no entry in the directory for this page, INQUIRY 402, then a directory entry for this new page is created and stored in main memory, STEP 403. At this point, there are no lines stored for the page, and thus, the directory entry for this page is empty. Processing then passes to STEP 406 described below.

Returning to INQUIRY 402, if, however, a new page is not being created, then the old version of the line is removed via the remove operation described above, STEP 404. Thereafter, the number, N, of full blocks required to store the compressed line and the size of the needed fragment (to store any remainder) are determined, STEP 406. For example, if a 1 k line is compressed to 600 bytes and each block of storage is 256 bytes, then it would take 2 (N=2) full blocks and a fragment large enough to store a remainder of 88 bytes to store the compressed line.

In accordance with the principles of the present invention, an attempt is made to store the remainder of the line in an end block of another line in the cohort that does not have a roommate, STEP 408. In particular, the size of the remainder is subtracted from the available space of each eligible end block of the cohort (i.e., one that does not already have a roommate) to determine where the remainder fits best. That is, for example, where the available space is large enough to hold the remainder, yet has the least amount of space left over. (In another embodiment, the best fit is simply the first fragment found that can fit the remainder. Other functions to determine the best fit are also possible without departing from the spirit of the present invention.)

If a roommate cannot be fit in with any of the end blocks of the cohort, INQUIRY 410, then N+1 blocks are allocated (by removing the blocks from the available list) for the compressed line in order to accommodate the full blocks plus the remainder, STEP 414. Additionally, the line is stored in the N+1 blocks and the directory entry for that line is updated, STEP 415.

Returning to INQUIRY 410, if there is an end block in the cohort that can accept a roommate (i.e., has a fragment that meets the best fit criterion), then N blocks are allocated to accommodate the full blocks needed to store the line, STEP 412. The line is then stored using the N blocks and the fragment, and the directory entries for the stored line and the line receiving the roommate are updated.

Described in detail above is a mechanism for reducing memory fragmentation when storing compressed cache lines in main memory. The mechanism of the present invention is not only applicable for cache lines being stored in main memory, but for any variable length objects (one example of which is a cache line and another example of which is a page) to be stored in one or more fixed-size blocks of storage, such as main memory, auxiliary memory or within other storage devices. These are therefore considered a part of the claimed invention. The mechanism of the present invention can be included in one or more computer program products, including computer useable media, in which the media include computer readable program code means for providing and facilitating the mechanism of the present invention. The products can be included as part of a computer system or sold separately.

The computer system described above is only one example of a system that incorporates and uses the techniques of the present inventions. Other computing environments and systems can incorporate and use the present invention without departing from the spirit of the present invention.

The flow diagrams depicted herein are just exemplary. There may be many variations to these diagrams, or the steps described therein, without departing from the spirit of the invention. For instance, the steps may be performed in a different order, or steps may be added, deleted or modified. All of these variations are considered a part of the claimed invention.

Although a preferred embodiment has been depicted and described in detail herein, it will be apparent to those skilled in the relevant art that various modifications, additions, substitutions and the like can be made without departing from the spirit of the invention and these are therefore considered to be within the scope of the invention, as defined in the following claims.

What is claimed is:

1. A method for storing variable length objects in storage, comprising:

determining a remainder for a variable length object, said remainder representing a portion of said variable length object that takes up less than a full fixed-size block of storage; and storing said remainder in a fixed-size block of storage, wherein said fixed-size block of storage is adapted to receive another remainder of another variable length object, said variable length object and said another variable length object being of a same cohort.

2. The method of claim 1, wherein said storing comprises storing said remainder at one end of said fixed-size block of storage and further comprising storing said another remainder at another end of said fixed-size block of storage.

3. The method of claim 2, wherein said fixed-size block of storage is adapted to store only said remainder and said another remainder.

4. The method of claim 2, further comprising storing said variable length object, except for said remainder, in one or more additional fixed-size blocks of storage.

5. The method of claim 4, further comprising removing said variable length object from storage, said removing comprising deallocating said one or more additional fixed-size blocks of storage and eliminating one or more pointers to said remainder.

6. The method of claim 5, further comprising updating information relating to said another variable length object subsequent to said removing.

7. The method of claim 6, wherein said information comprises an indication of whether said another variable length object has a roommate within said fixed-size block of storage.

8. The method of claim 1, wherein said cohort comprises a subset of a plurality of variable length objects.

9. The method of claim 8, wherein said subset is determined based upon a predetermined function.

10. The method of claim 8, wherein said plurality of variable length objects comprises a plurality of compressed cache lines and wherein said subset comprises one or more of said plurality of compressed cache lines of a single page of memory.

11. The method of claim 8, wherein said plurality of variable length objects comprises a plurality of compressed cache lines and wherein said subset comprises two or more of said plurality of compressed cache lines of multiple pages of memory.

12. The method of claim 1, further comprising selecting said another remainder to be stored as a roommate of said remainder based upon a predefined function.

13. The method of claim 12, wherein said predefined function is a best fit function.

14. The method of claim 1, further comprising storing one or more of the following information:
- a size of said remainder, a position of said remainder within said fixed-size block of storage, and an indication of whether said remainder has a roommate within said fixed-size block of storage.

15. The method of claim 14, further comprising updating said information subsequent to at least one of removing said remainder from said fixed-size block of storage and storing said another remainder in said fixed-size block of storage.

16. A method for storing variable length objects in storage, comprising:
- defining a cohort of objects, said cohort of objects being a subset of a plurality of variable length objects;
- determining a number, N, of full fixed-size blocks of storage required to store an object of said cohort of objects;
- determining a remainder for said object, said remainder representing a portion of said object that does not fit within said N full fixed-size blocks of storage;
- selecting another fixed-size block of storage to store said remainder, said another fixed-size block of storage having stored therein another remainder of another object of said cohort of objects; and
- storing said object, except for said remainder, in said N full fixed-size blocks and storing said remainder in said selected another fixed-size block.

17. The method of claim 16, wherein said another remainder is stored at one end of said another fixed-size block of storage and said remainder is stored at another end of said another fixed-size block of storage.

18. The method of claim 16, wherein said selecting comprises choosing said another fixed-size block based on a predefined function.

19. The method of claim 18, wherein said predefined function is a best fit function.

20. A system for storing variable length objects in storage, comprising:
- means for determining a remainder for a variable length object, said remainder representing a portion of said variable length object that takes up less than a full fixed-size block of storage; and
- a fixed-size block of storage, said fixed-size block of storage storing said remainder and being adapted to receive another remainder of another variable length object, said variable length object and said another variable length object being of a same cohort.

21. The system of claim 20, wherein said remainder is stored at one end of said fixed-size block of storage and said another remainder is stored at another end of said fixed-size block of storage.

22. The system of claim 21, further comprising one or more additional fixed-size blocks of storage storing said variable length object, except for said remainder.

23. The system of claim 22, further comprising means for removing said variable length object from storage, said means for removing comprising means for deallocating said one or more additional fixed-size blocks of storage and means for eliminating one or more pointers to said remainder.

24. The system of claim 23, further comprising means for updating information relating to said another variable length object subsequent to said removing.

25. The system of claim 20, wherein said cohort comprises a subset of a plurality of variable length objects.

26. The system of claim 25, wherein said subset is determined based upon a predetermined function.

27. The system of claim 25, wherein said plurality of variable length objects comprises a plurality of compressed cache lines and wherein said subset comprises one or more of said plurality of compressed cache lines of a single page of memory.

28. The system of claim 25, wherein said plurality of variable length objects comprises a plurality of compressed cache lines and wherein said subset comprises two or more of said plurality of compressed cache lines of multiple pages of memory.

29. The system of claim 20, further comprising means for selecting said another remainder to be stored as a roommate of said remainder based upon a predefined function.

30. The system of claim 20, further comprising a portion of memory, said portion of memory storing one or more of the following information:
- a size of said remainder, a position of said remainder within said fixed-size block of storage, and an indication of whether said remainder has a roommate within said fixed-size block of storage.

31. The system of claim 30, further comprising means for updating said information subsequent to at least one of removing said remainder from said fixed-size block of storage and storing said another remainder in said fixed-size block of storage.

32. A system for storing variable length objects in storage, comprising:
- means for defining a cohort of objects, said cohort of objects being a subset of a plurality of variable length objects;
- a number, N, of full fixed-size blocks of storage to store an object of said cohort of objects;
- means for determining a remainder for said object, said remainder representing a portion of said object that does not fit within said N full fixed-size blocks of storage;
- another fixed-size block of storage to store said remainder, said another fixed-size block of storage having stored therein another remainder of another object of said cohort of objects; and
- means for storing said object, except for said remainder, in said N full fixed-size blocks of storage and means for storing said remainder in said selected another fixed-size block of storage.

33. The system of claim 32, further comprising means for selecting said another fixed-size block of storage based on a predefined function.

34. A computer program product comprising a computer useable medium having computer readable program code means therein for use in storing variable length objects in storage, said computer readable program code means in said computer program product comprising:

computer readable program code means for causing a computer to affect determining a remainder for a variable length object, said remainder representing a portion of said variable length object that takes up less than a full fixed-size block of storage; and computer readable program code means for causing a computer to affect storing said remainder in a fixed-size block of storage, wherein said fixed-size block of storage is adapted to receive another remainder of another variable length object, said variable length object and said another variable length object being of a same cohort.

35. The computer readable program code means of claim 34, wherein said computer readable program code means for causing a computer to affect storing comprises computer readable program code means for causing a computer to affect storing said remainder at one end of said fixed-size block of storage and further to affect storing said another remainder at another end of said fixed-size block of storage.

36. The computer readable program code means of claim 35, further comprising computer readable program code means for causing a computer to affect storing said variable length object, except for said remainder, in one or more additional fixed-size blocks of storage.

37. The computer readable program code means of claim 36, further comprising computer readable program code means for causing a computer to affect removing said variable length object from storage, said removing comprising deallocating said one or more additional fixed-size blocks of storage and eliminating one or more pointers to said remainder.

38. The computer readable program code means of claim 37, further comprising computer readable program code means for causing a computer to affect updating information relating to said another variable length object subsequent to said removing.

39. The computer readable program code means of claim 34, wherein said cohort comprises a subset of a plurality of variable length objects.

40. The computer readable program code means of claim 34, further comprising computer readable program code means for causing a computer to affect selecting said another remainder to be stored as a roommate of said remainder based upon a predefined function.

41. The computer readable program code means of claim 34, further comprising computer readable program code means for causing a computer to affect storing one or more of the following information:

a size of said remainder, a position of said remainder within said fixed-size block of storage, and an indication of whether said remainder has a roommate within said fixed-size block of storage.

42. The computer readable program code means of claim 41, further comprising computer readable program code means for causing a computer to affect updating said information subsequent to at least one of removing said remainder from said fixed-size block of storage and storing said another remainder in said fixed-size block of storage.

43. A computer program product comprising a computer useable medium having computer readable program code means therein for use in storing variable length objects in storage, said computer readable program code means in said computer program product comprising:

computer readable program code means for causing a computer to affect defining a cohort of objects, said cohort of objects being a subset of a plurality of variable length objects;

computer readable program code means for causing a computer to affect determining a number, N, of full fixed-size blocks of storage required to store an object of said cohort of objects;

computer readable program code means for causing a computer to affect determining a remainder for said object, said remainder representing a portion of said object that does not fit within said N full fixed-size blocks of storage;

computer readable program code means for causing a computer to affect selecting another fixed-size block of storage to store said remainder, said another fixed-size block of storage having stored therein another remainder of another object of said cohort of objects; and computer readable program code means for causing a computer to affect storing said object, except for said remainder, in said N full fixed-size blocks and to affect storing said remainder in said selected another fixed-size block.

44. The computer readable program code means of claim 43, wherein said computer readable program code means for causing a computer to affect selecting comprises computer readable program code means for causing a computer to affect choosing said another fixed-size block based on a predefined function.

* * * * *